(12) United States Patent
Sprengel et al.

(10) Patent No.: US 8,474,797 B2
(45) Date of Patent: Jul. 2, 2013

(54) AIR SPRING SYSTEM

(75) Inventors: Thomas Sprengel, Stuttgart (DE); Claus Blattner, Oberderdingen (DE)

(73) Assignee: Dr. Ing h.c. F. Porsche Aktiengesellschaft, Stuttgart (DE)

( * ) Notice: Subject to any disclaimer, the term of this patent is extended or adjusted under 35 U.S.C. 154(b) by 237 days.

(21) Appl. No.: 13/031,439

(22) Filed: Feb. 21, 2011

(65) Prior Publication Data

US 2011/0203687 A1 Aug. 25, 2011

(30) Foreign Application Priority Data

Feb. 20, 2010 (DE) .......... 10 2010 008 748

(51) Int. Cl.
*F16F 9/43* (2006.01)
*B60G 17/015* (2006.01)

(52) U.S. Cl.
USPC .......... 267/64.28; 280/5.514; 280/124.161

(58) Field of Classification Search
USPC .......... 267/64.28; 280/5.514, 6.157, 6.159, 280/124.16, 124.161
See application file for complete search history.

(56) References Cited

U.S. PATENT DOCUMENTS

| | | | |
|---|---|---|---|
| 6,685,174 B2 * | 2/2004 | Behmenburg et al. | 267/64.28 |
| 6,726,189 B2 * | 4/2004 | Folchert et al. | 267/64.28 |
| 6,874,772 B2 * | 4/2005 | Oldenettel | 267/64.28 |
| 7,032,895 B2 * | 4/2006 | Folchert | 267/64.28 |
| 7,097,166 B2 * | 8/2006 | Folchert | 267/64.28 |
| 7,624,994 B2 * | 12/2009 | Stegmann | 280/5.514 |
| 2008/0054576 A1 | 3/2008 | Ilias et al. | |
| 2009/0079155 A1 | 3/2009 | Rehra et al. | |

FOREIGN PATENT DOCUMENTS

| | | |
|---|---|---|
| CN | 101445028 A | 6/2009 |
| DE | 10322578 B3 * | 9/2004 |
| DE | 10 2004 038711 | 2/2006 |
| DE | 10 2004 038705 | 4/2006 |
| JP | 2008-544893 | 12/2008 |
| WO | WO2009/132895 A1 | 11/2009 |

OTHER PUBLICATIONS

German Search Report of application No. DE 10 2010 008748, dated Nov. 24, 2010.

* cited by examiner

*Primary Examiner* — Thomas J Williams

(74) *Attorney, Agent, or Firm* — RatnerPrestia

(57) ABSTRACT

An air spring system is disclosed. The air spring system has a compressor, which has a suction side and a delivery side, a pressure reservoir, a first valve device and a second valve device. Each valve device is connected between the compressor and the pressure reservoir. In order to provide the air spring system, which is of simple construction and can be produced economically, the first valve device and the second valve device are each embodied as 3/2-way valves.

10 Claims, 5 Drawing Sheets

AIR SPRING SYSTEM

CROSS REFERENCE TO RELATED APPLICATION

This U.S. patent application claims priority to German Patent Application DE 10 2010 008748.3, filed Feb. 20, 2010, which is incorporated by reference herein in its entirety.

FIELD OF THE INVENTION

The invention relates to an air spring system having a compressor, which has a suction side and a delivery side, having a pressure reservoir and having a first valve device and a second valve device, which are connected between the compressor and the pressure reservoir. The invention furthermore relates to a motor vehicle having an air spring system of this kind.

BACKGROUND OF THE INVENTION

Air spring systems operate either with a closed or an open control loop. In the case of open air spring systems, air is drawn in from the environment by a compressor and delivered to air springs of a motor vehicle in order to raise the motor vehicle. For discharge, the air is discharged to the environment, for example. It is possible here to use a pressure reservoir to enable the motor vehicle to be raised even without the compressor, if required. In closed air spring systems, air is conveyed backwards and forwards between a pressure reservoir and the air springs in order to raise or lower the motor vehicle. Owing to leaks, it may be necessary to replenish the system with air from outside, even in a closed air spring system. The additional air can be fed into the pressure reservoir or directly into the air springs. In this system, account must be taken of the fact that the air flows under pressure through an air drier as the system is filled. During discharge, the air should be discharged to the environment through the drier in order to remove the moisture that has accumulated in the drier and regenerate the drier. German Patent DE 10 2004 038 705 B3, which is incorporated by reference herein, has disclosed a compressed air system for a motor vehicle which is used to supply air-operated loads.

SUMMARY OF THE INVENTION

It is an object of the invention to provide an air spring system which is of simple construction and can be produced economically.

This object is achieved in an air spring system having a compressor, which has a suction side and a delivery side, having a pressure reservoir and having a first valve device and a second valve device, which are connected between the compressor and the pressure reservoir, in that the first valve device and the second valve device are each embodied as 3/2-way valves. The use in accordance with the invention of the 3/2-way valves makes possible a simple pneumatic circuit. The arrangement in accordance with the invention of the 3/2-way valves enables the motor vehicle to be raised directly, even when the air spring system is empty. This provides the advantage that it is not necessary to fill the pressure reservoir before raising the motor vehicle, thereby considerably shortening unwanted waiting times.

A preferred illustrative embodiment of the air spring system is characterized in that the first valve device is connected between the suction side of the compressor and the pressure reservoir. The first valve device is preloaded, preferably by a spring, into a control position in which the pressure reservoir is connected to the suction side of the compressor. The first valve device is preferably electromagnetically actuable.

Another preferred illustrative embodiment of the air spring system is characterized in that the first valve device is connected to the second valve device by a first valve connecting line and a second valve connecting line. Via the two valve connecting lines and the two valve devices, the pressure reservoir can be connected to at least one air spring.

Another preferred illustrative embodiment of the air spring system is characterized in that the second valve device is connected between the delivery side of the compressor and at least one air spring. The second valve device is preferably assigned a plurality of air springs. The second valve device is preloaded, preferably by a spring, into a control position in which a port for the air spring is connected to the first valve connecting line. The second valve device is preferably electromagnetically actuable.

Another preferred illustrative embodiment of the air spring system is characterized in that an air spring valve is connected between the second valve device and the air spring. The air spring valve is preferably a 2/2-way valve with an open position and a closed position. In the closed position, the connection between the second valve device and the air spring is interrupted while, in the open position, the connection is open.

Another preferred illustrative embodiment of the air spring system is characterized in that the second valve connecting line is connected to an intake line via a check valve. An air filter can be arranged in the intake line. The check valve allows air to be drawn in from the environment and prevents unwanted escape of air from the air filter system into the environment.

Another preferred illustrative embodiment of the air spring system is characterized in that the first valve connecting line is connected to the delivery side of the compressor. Like the second connecting line, the first connecting line is connected both to the first valve device and to the second valve device.

Another preferred illustrative embodiment of the air spring system is characterized in that the first valve connecting line is connected to a discharge line via a discharge valve. The discharge valve is preferably embodied as a 2/2-way valve with an open position and a closed position. In the open position of the discharge valve, air can be discharged from the air spring system. The discharge valve is preferably preloaded into a closed position, in which the discharge line is closed.

Another preferred illustrative embodiment of the air spring system is characterized in that a one-way restrictor device and an air drier are connected in series between the first valve connecting line and the delivery side of the compressor. In the one-way restrictor device, a check valve and a restrictor are connected in parallel. The check valve prevents air from flowing back to the return side of the compressor in an unrestricted way. A check valve can be connected between the one-way restrictor device and the air drier, preventing unwanted backflow through the drier.

The invention furthermore relates to a motor vehicle having an air spring system as described above. The motor vehicle preferably has two, in particular four, air springs, to each of which an air spring valve is assigned.

Further advantages, features and details of the invention will emerge from the following description, in which various illustrative embodiments are described specifically with reference to the drawing.

DETAILED DESCRIPTION OF THE PREFERRED EMBODIMENTS

Figure 1:
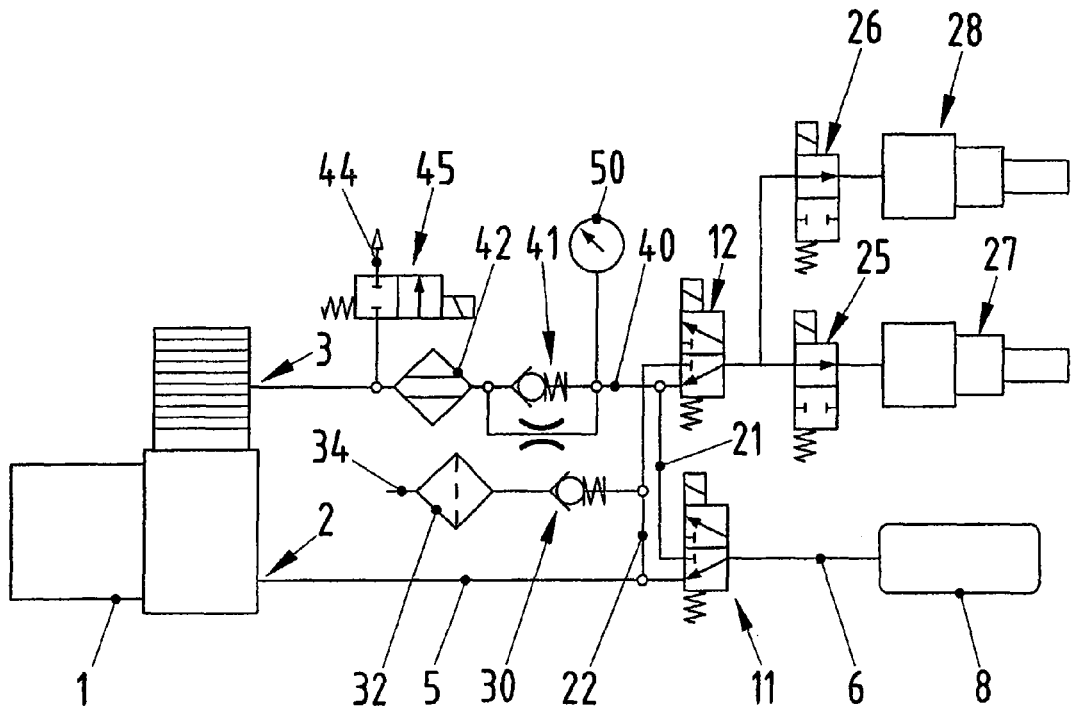
FIGS. 1 to 9 show different illustrative embodiments and states of air spring systems according to aspects of the invention.

In FIGS. 1 to 9, different illustrative embodiments and states of an air spring system according to aspects of the invention are shown in the form of pneumatic circuit diagrams. The air spring system comprises a compressor 1 with a suction side 2 and a delivery side 3. The suction side 2 of the compressor 1 can be connected to a pressure reservoir 8 via lines 5, 6. Lines 5, 6 are pneumatic lines, as are further lines described below.

A first valve device 11 is connected between the suction side 2 of the compressor 1 and the pressure reservoir 8. The first valve device 11 is embodied as a 3/2-way valve. Lines 5 and 6 are connected to two ports of the first valve device 11. A first valve connecting line 21 is connected to the third port of the first valve device 11. Via the first valve connecting line 21, the first valve device 11 is connected to a second valve device 12.

The second valve device 12 is likewise embodied as a 3/2-way valve. Connected to the second valve device 12 is a second valve connecting line 22, which connects the two valve devices 11, 12 in parallel with the first valve connecting line 21.

Two air springs 27, 28 of a motor vehicle are connected to a port of the second valve device 12 via air spring valves 25, 26. The two air spring valves 25, 26 are each embodied as 2/2-way valves with a closed position and an open position. In the open position, the air spring 27, 28 assigned to the air spring valve 25, 26 is connected to the second valve device 12.

Branching off from the second valve connecting line 22 is an intake line 34 fitted with a check valve 30 and an air filter 32. Via the intake line 34, it is possible for air, for example, to be drawn into the otherwise closed air spring system from the environment. The check valve 30 prevents unwanted escape of air from the closed air spring system into the environment.

The first valve connecting line 21 is connected to the delivery side 3 of the compressor 1 via a line 40. Starting from the first valve connecting line 21, a one-way restrictor device 41 and an air drier 42 are arranged in series in line 40.

The one-way restrictor device 41 comprises a check valve arranged in line 40 and a restrictor arranged in parallel thereto. The check valve in the one-way restrictor device 41 prevents air from flowing into the air drier 42 in an unrestricted way.

A discharge line 44 with a discharge valve 45 branches off from line 40 between the delivery side 3 of the compressor 1 and the air drier 42. The discharge valve 44 is embodied as a 2/2-way valve with a closed position and an open position.

The electromagnetically actuable discharge valve 45 is preloaded into its illustrated closed position, in which the discharge line 44 is closed, by a spring, for example. When the discharge valve 45 is actuated, the discharge valve 45 switches to its open position, in which the discharge line 44 is opened to the environment, for example.

The pressure in line 40 is detected by a pressure sensor 50 between the one-way restrictor device 41 and the first valve connecting line 21.

The air spring system shown in FIGS. 1 to 9 makes available a particularly efficient and hence economical pneumatic circuit, which makes possible the following functions inter alia: delivery of air from the at least one pressure reservoir 8 or from two pressure reservoirs to at least one of the air springs 27, 28 with the compressor 1; transfer of air from the at least one pressure reservoir 8 to at least one of the air springs 27, 28 through the stationary compressor 1, using a pressure gradient; delivery of air from at least one of the air springs 27, 28 to the at least one pressure reservoir 8 with the compressor 1; transfer of air from at least one of the air springs 27, 28 to the at least one pressure reservoir 8 through the stationary compressor 1, using a pressure gradient; transfer of air from the at least one pressure reservoir 8 to at least one of the air springs 27, 28, bypassing the compressor 1, using a pressure gradient; transfer of air from at least one of the air springs 27, 28 to the at least one pressure reservoir 8, bypassing the compressor 1, using a pressure gradient; delivery of air from the environment when the pressure reservoir 8 is empty to at least one of the air springs 27, 28, with the induced air being dried in the air drier 42; discharge of air from at least one of the air springs 27, 28 to the environment, with regeneration of the air drier 42; delivery of air from the environment to the at least one pressure reservoir 8, with the induced air being dried in the air drier 42; discharge of air from the at least one pressure reservoir 8 to the environment, with regeneration of the air drier 42; measurement of the pressure in the at least one pressure reservoir 8 with the aid of the pressure sensor 50; measurement of the pressure in at least one of the air springs 27, 28 with the aid of the pressure sensor 50.

The way in which the closed air spring system is raised is shown in FIG. 1. In the illustrated state of the circuit, the pressure reservoir 8 is connected to the suction side 2 of the compressor 1 via the first valve device 11. The first valve connecting line 21 is likewise connected to the suction side 2 of the compressor 1 via line 5. This allows air transfer from the pressure reservoir 8 to the air springs 27, 28 through the compressor 1. The reservoir pressure of the pressure reservoir 8 keeps the check valve 30 in the intake line 34 closed. During raising, the compressor 1 can be stationary or in operation.

Figure 2:
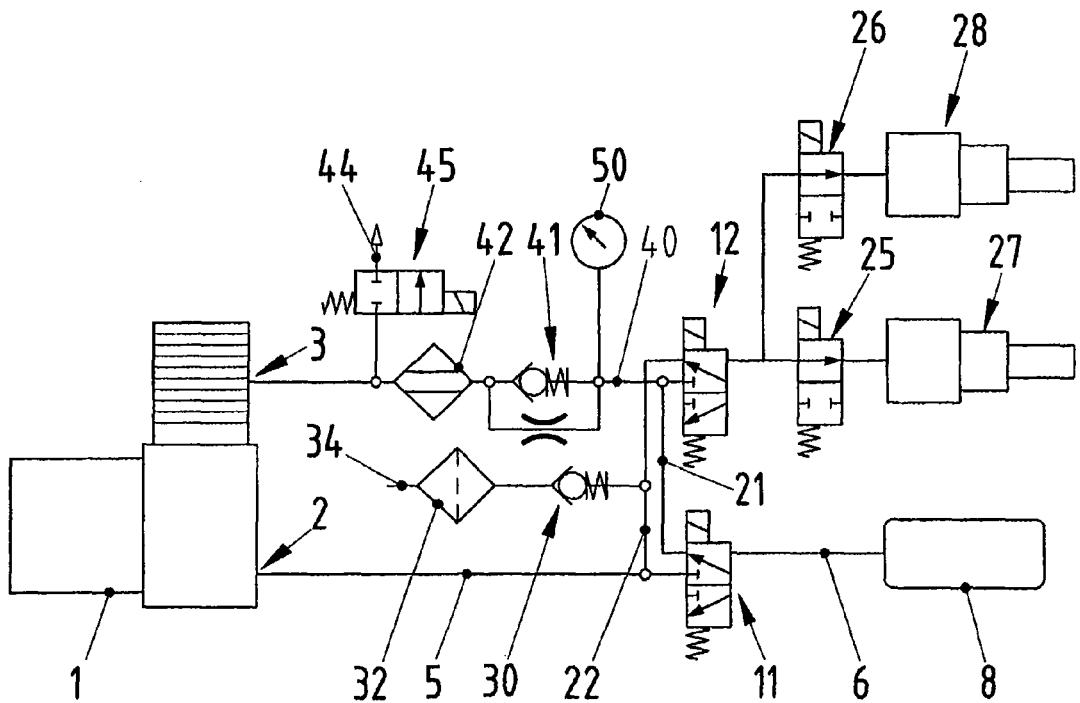

The way in which the closed air spring system is lowered is shown in FIG. 2. The two air springs 27, 28 are connected to the suction side 2 of the compressor 1 via the second valve device 12 and the second valve connecting line 22. The pressure reservoir 8 is connected to the delivery side 3 of the compressor 1 via the first valve device 11, and the first valve connecting line 21 is connected to the delivery side 3 of said compressor 1 via the one-way restrictor device 41 and the air drier 42. Transfer of air from the air springs 27, 28 to the pressure reservoir 8 takes place via the compressor 1. The air spring pressure closes the check valve 30 in the intake line 34. Lowering can be accomplished by way of the operating compressor 1. However, lowering can also be accomplished without the compressor 1, using a pressure gradient.

Figure 3:
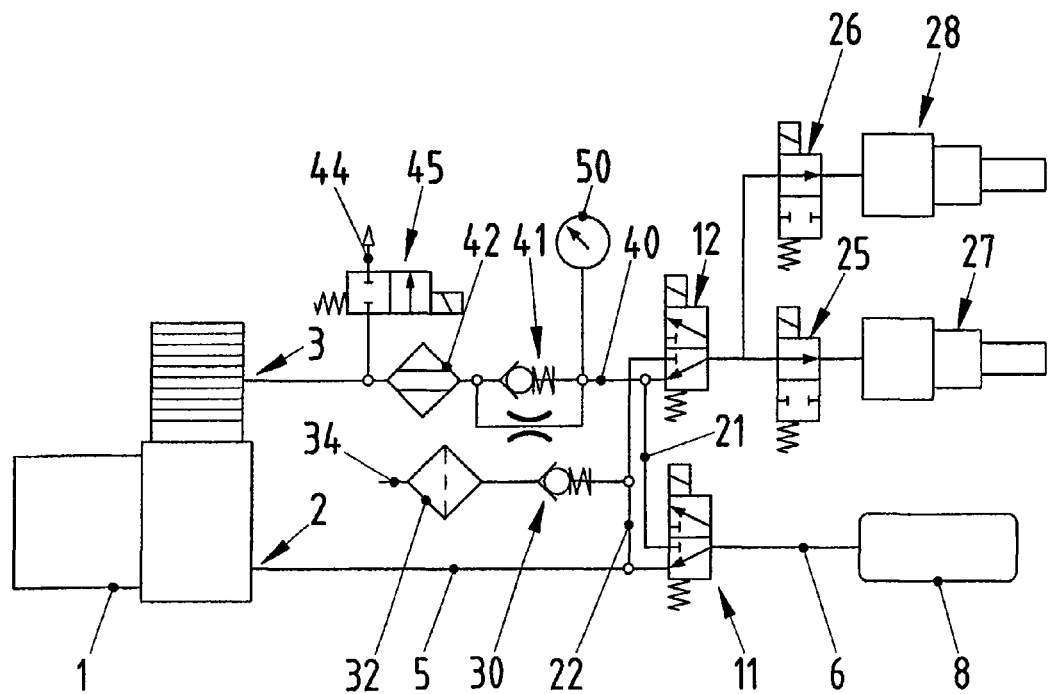

FIG. 3 shows how the open air spring system is raised, with the air being dried and with the pressure reservoir 8 empty. The two air springs 27, 28 are connected to the delivery side 3 of the compressor 1 via the second valve device 12 and line 40. The suction side 2 of the compressor 1 is connected to the empty pressure reservoir 8 via the first valve device 11. The vacuum caused by air induction opens the check valve 30 in the intake line 34. The induced air flows under pressure through the air drier 42 and releases moisture. As the air springs 27, 28 are filled, the air spring pressure is measured with the aid of the pressure sensor 50.

Figure 4:
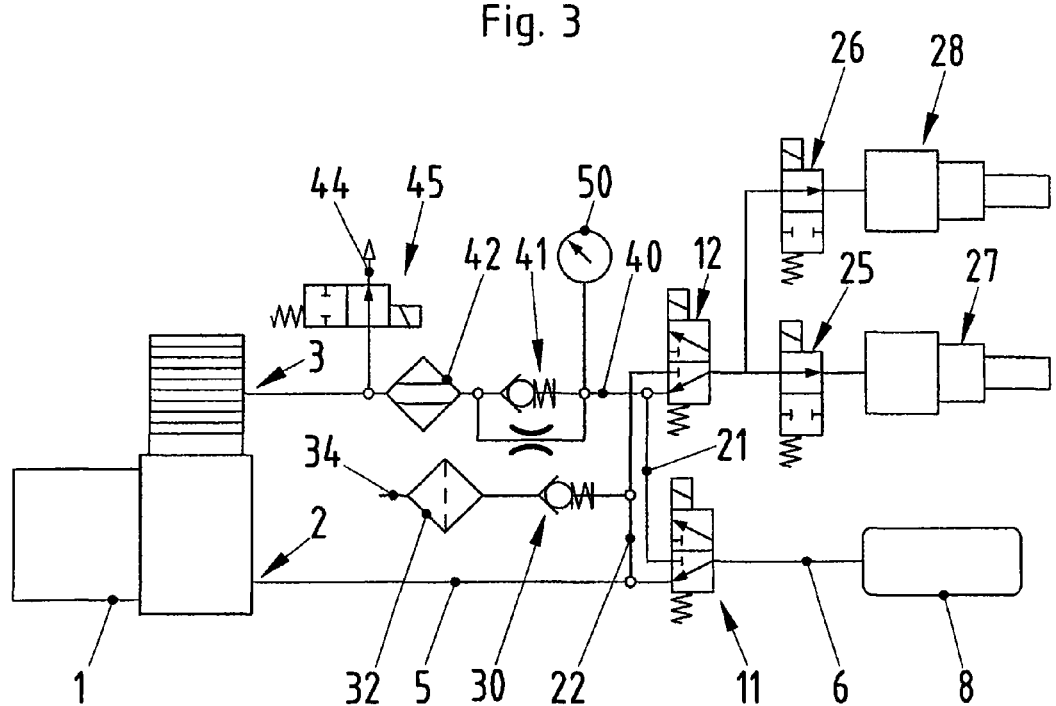

The way in which the open air spring system is lowered with drier regeneration is shown in FIG. 4. The discharge valve 45 is in its open position, allowing air to escape via the discharge line 44. Owing to the pressure gradient relative to the air spring pressure, which is detected with the pressure sensor 50, the check valve 30 in the one-way restrictor device 41 closes. The decompressed air can thus escape via the restrictor of the one-way restrictor device 41, through the drier 42 and the discharge line 44. The pressure reservoir 8 is connected to the suction side 2 of the compressor 1 via the first valve device 11.

Figure 5:
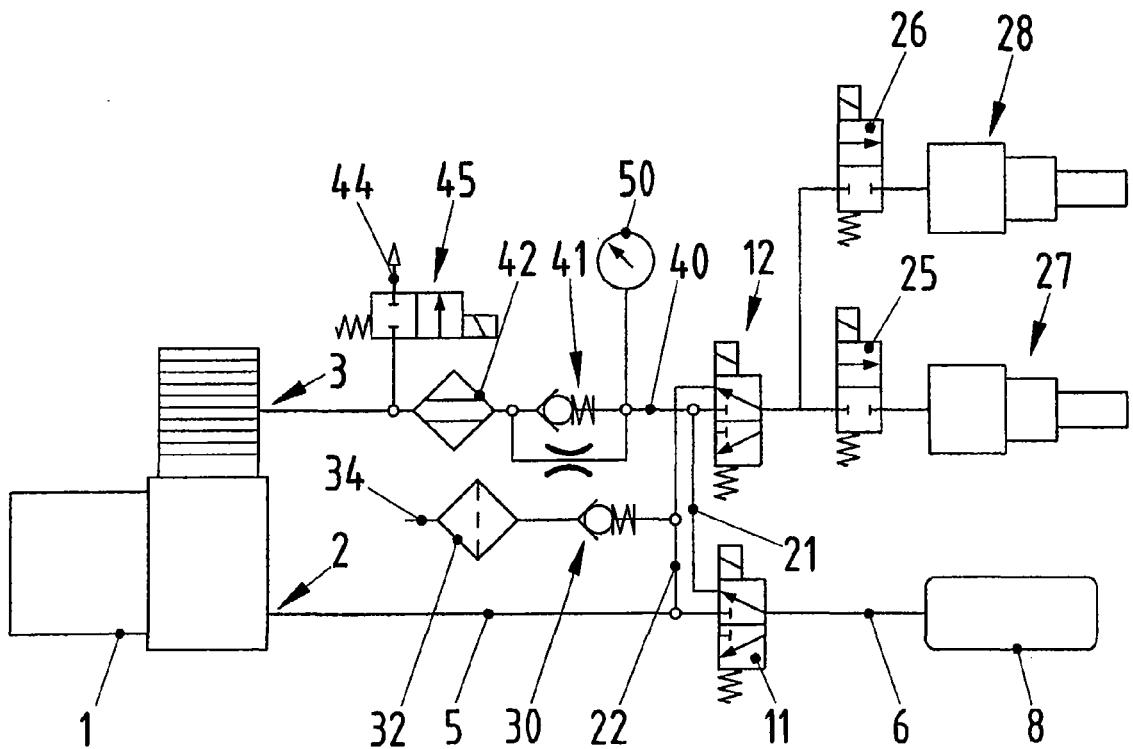

FIG. 5 shows how the pressure reservoir 8 is filled, with the air being dried and the pressure being measured. The pressure reservoir 8 is connected to the delivery side 3 of the compressor 1 via the first valve device 11, the first valve connecting line 21 and line 40. The two air spring valves 25, 26 are closed. The suction side 2 of the compressor 1 is connected to the intake line 34 via line 5 and the second valve connecting line 22. The vacuum caused by air induction opens the check valve 30 in the intake line 34. The induced air flows under pressure through the air drier 42 and releases moisture. As the pressure reservoir 8 is filled, the reservoir pressure is measured by means of the pressure sensor 50.

Figure 6:
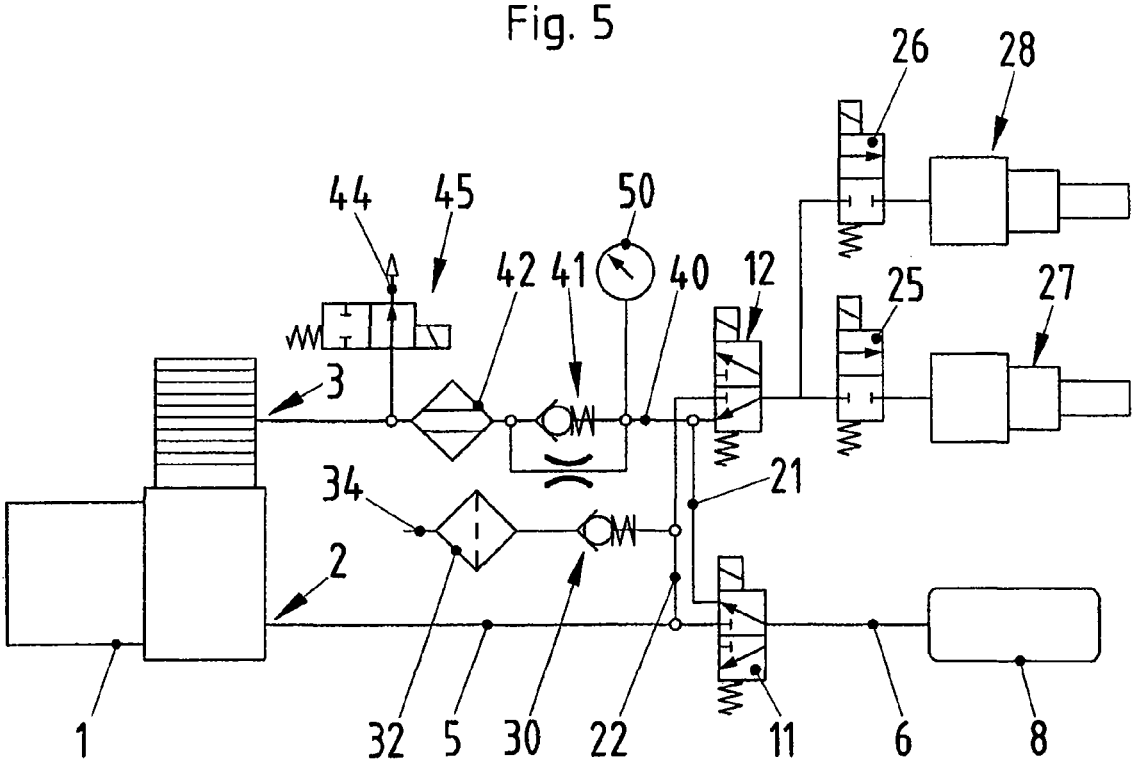

The way in which the pressure reservoir 8 is emptied, with drier regeneration, is shown in FIG. 6. The pressure reservoir 8 is connected to line 40 via the first valve device 11 and the first valve connecting line 21. The two air spring valves 25, 26 are closed. The discharge valve 45 is open. The pressure prevailing in the discharge line 45 is therefore ambient pressure. The pressure difference causes the check valve of the one-way restrictor device 41 to close. Decompressed air flows via the restrictor of the one-way restrictor device 41, through the drier 42 and via the discharge line 45 into the environment. Owing to the backpressure ahead of the one-way restrictor device 41, the reservoir pressure can be measured with the pressure sensor 50.

Figure 7:
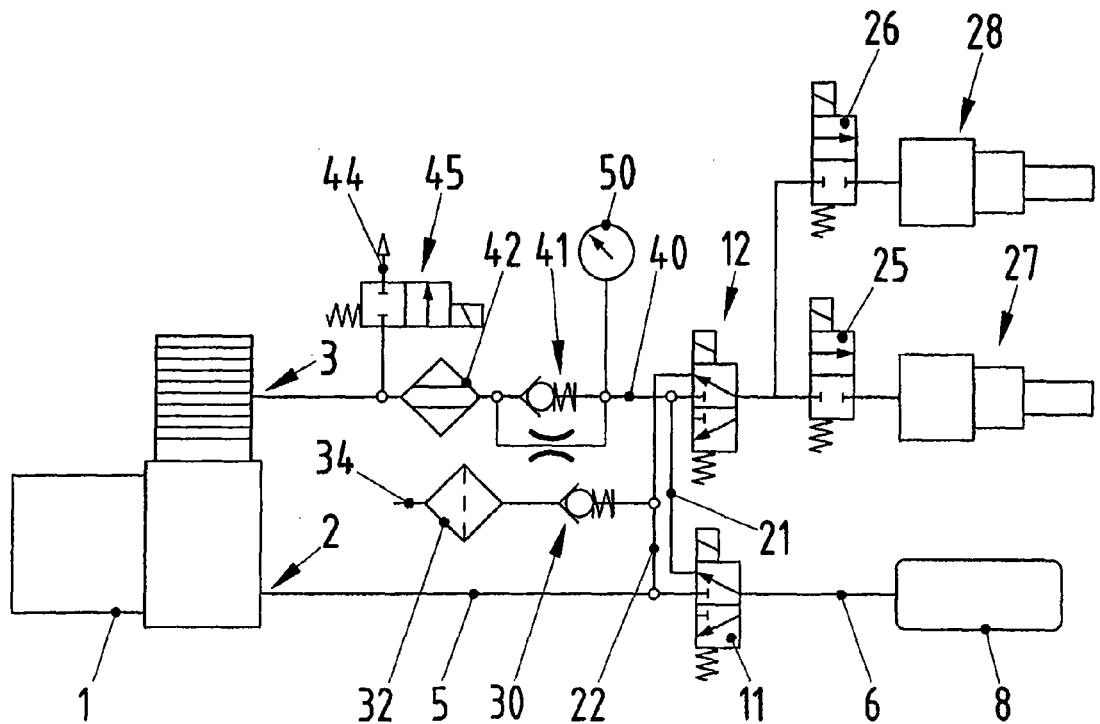

FIG. 7 shows how the pressure in the pressure reservoir 8 is measured with the pressure sensor 50. The pressure reservoir 8 is connected to the delivery side 3 of the compressor 1 via the first valve device 11, the first valve connecting line 21 and line 40. The connection between the first valve connecting line 21 and the air springs 27, 28 is interrupted by the second valve device 12. The air spring valves 25, 26 are closed.

Figure 8:
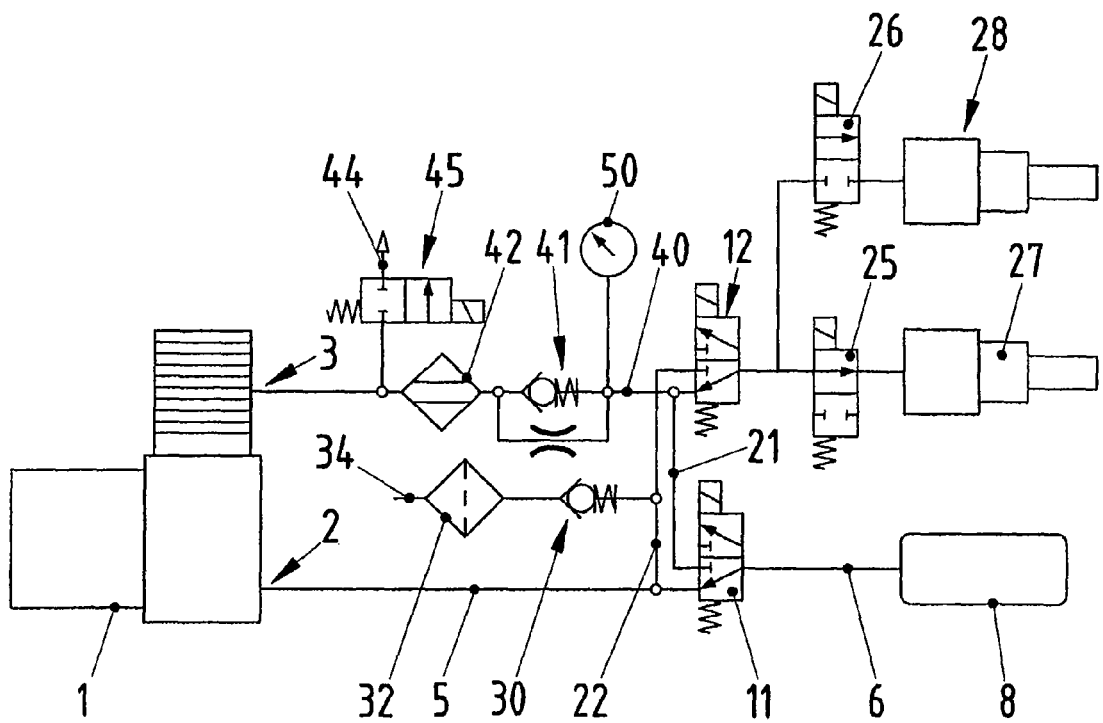

FIG. 8 shows how the pressure in air spring 27 is measured with the pressure sensor 50. Air spring valve 26 is closed. Air spring valve 25 is open. Air spring 27 is connected to the delivery side 3 of the compressor 1 via the opened air spring valve 25, the second valve device 12 and line 40. The connection between the first valve connecting line 21 and the pressure reservoir 8 is interrupted by the first valve device 11.

Figure 9:
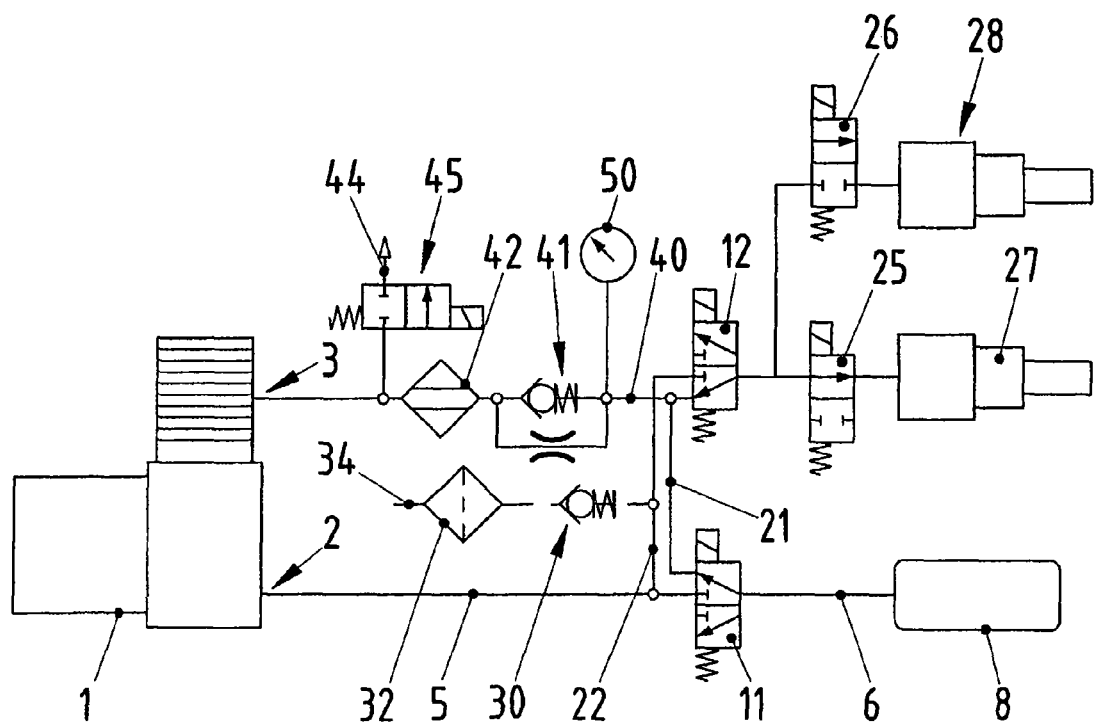

FIG. 9 shows how the closed air spring system can be raised or lowered through air transfer, with the compressor 1 being bypassed. Air spring valve 26 is closed. Air spring valve 25 is open. Air spring 27 is connected to the pressure reservoir 8 via the opened air spring valve 25, the second valve device 12, the first valve connecting line 21 and the first valve device 11. A pressure balance can thus be brought about through air transfer from air spring 27 to the pressure reservoir 8 or, conversely, from the pressure reservoir 8 to air spring 27. Since the compressor 1 is bypassed during air transfer, it can remain switched off.

The invention claimed is:

1. An air spring system comprising:
   a compressor, which has a suction side and a delivery side;
   a pressure reservoir;
   a first valve device connected between the compressor and the pressure reservoir;
   a second valve device;
   wherein the first valve device and the second valve device are each embodied as 3/2-way valves, the first valve device is connected to a first line from the suction side and the second valve device is connected to a second line from the delivery side;
   a first valve connecting line, which is branched off from the second line at a location that is upstream of the second valve device, is connected to the first valve device; and
   a second valve connecting line, which is branched off from the first line at a location that is downstream of the first valve device, is connected to the second valve device.

2. The air spring system as claimed in claim 1, wherein the first valve device is connected between the suction side of the compressor and the pressure reservoir.

3. The air spring system as claimed in claim 1, wherein the first valve device is connected to the second valve device by the first valve connecting line and the second valve connecting line.

4. The air spring system as claimed in claim 3, wherein the second valve device is connected between the delivery side of the compressor and at least one air spring.

5. The air spring system as claimed in claim 4, wherein an air spring valve is connected between the second valve device and the air spring.

6. The air spring system as claimed in claim 3, wherein the second valve connecting line is connected to an intake line via a check valve.

7. The air spring system as claimed in claim 3, wherein the first valve connecting line is connected to the delivery side of the compressor.

8. The air spring system as claimed in claim 3, wherein the first valve connecting line is connected to a discharge line via a discharge valve.

9. The air spring system as claimed in claim 7, wherein a one-way restrictor device and an air drier are connected in series between the first valve connecting line and the delivery side of the compressor.

10. A motor vehicle having an air spring system as claimed in claim 1.

* * * * *